United States Patent [19]

Johnson

[11] 4,410,057
[45] Oct. 18, 1983

[54] EMERGENCY HYDRAULIC SYSTEM
[75] Inventor: Kenneth C. Johnson, Coloma, Mich.
[73] Assignee: Clark Equipment Company, Buchanan, Mich.
[21] Appl. No.: 148,470
[22] Filed: May 9, 1980
[51] Int. Cl.³ ............................................. B62D 5/06
[52] U.S. Cl. ..................................... 180/133; 60/405
[58] Field of Search ................... 180/133, 134; 60/403, 60/404, 405

[56] References Cited

U.S. PATENT DOCUMENTS

| | | | |
|---|---|---|---|
| 2,954,671 | 10/1960 | Kress | 60/52 |
| 3,820,620 | 6/1974 | Miller et al. | 60/405 X |
| 3,913,324 | 10/1975 | Miller et al. | 60/405 |
| 3,921,748 | 11/1975 | Dunn | 60/405 X |
| 3,940,931 | 3/1976 | Renfro et al. | 60/403 |
| 4,079,806 | 3/1978 | Hoag et al. | 180/133 |
| 4,102,129 | 7/1978 | Maes | 60/403 |
| 4,317,499 | 3/1982 | Miller | 60/405 X |
| 4,345,660 | 8/1982 | Miller | 180/133 |

Primary Examiner—Joseph Paul Brust
Attorney, Agent, or Firm—Kenneth C. Witt; John C. Wiessler

[57] ABSTRACT

An emergency hydraulic system for a vehicle having a hydraulic steering mechanism normally supplied by an engine driven pump. An electric motor driven pump supplies the steering mechanism under emergency conditions. The electric motor driven pump is inoperative during normal operation of the engine but if the engine ceases to operate it comes on responsively to the occurrence of a predetermined condition in the hydraulic circuit. In order to prevent the electric motor driven pump from operating during engine starting a relay is provided having a normally open switch in circuit with the motor. The relay is operated by a normally open engine condition switch which is arranged to close when the engine is running. The relay holds itself in, thus preparing the electric motor for operation should the predetermined condition occur in the hydraulic circuit of the steering mechanism.

6 Claims, 1 Drawing Figure

EMERGENCY HYDRAULIC SYSTEM

BACKGROUND OF THE INVENTION

1. Field of the Invention

This invention relates to an electrically operated emergency system for supplying pressurized hydraulic fluid to a vehicle hydraulic steering or other mechanism which is normally supplied by an engine driven pump.

2. Description of the Prior Art

It is known to steer a vehicle by means of hydraulic actuators which are supplied with pressurized hydraulic fluid from a pump which is driven by the same engine which propels the vehicle. Steering is accomplished by utilizing the operator's steering wheel or other steering device to control the flow of pressurized fluid to the steering actuators.

It is known to provide an electrical emergency hydraulic system for such a vehicle in which there is a sensor which detects a loss of pressure or other condition of the hydraulic circuit in the vehicle steering mechanism which indicates that an emergency source of hydraulic pressure is required. Typically this is a pressure sensor which senses a loss in pressure in the hydraulic steering mechanism below a predetermined amount which closes a switch and energizes an emergency hydraulic pump driven by an electric motor.

A drawback to such an arrangement is that the pressure sensitive switch is closed when there is no pressure in the hydraulic steering mechanism and this condition obtains during starting of the engine of the vehicle which operates the main steering hydraulic pump. Thus the emergency steering system is energized when engine starting is initiated. This imposes an additional load on the electrical system during engine starting and in adverse conditions such as cold weather starting can interfere with engine starting.

It is known to provide an electrical automatic system for preventing operation of the electric motor driven pump during engine starting and such a system is shown in U.S. Pat. No. 4,079,806 Hoag et al. However, in this patent the relay which prevents operation of the emergency steering system by opening the circuit to the electric motor driving the emergency steering pump, is operated by a switch which closes each time the transmission of the vehicle is placed in or shifted through neutral. Thus the relay is subject to considerable mechanical wear and as a result may not be ready for emergency operation should that be required. The present invention avoids this deficiency.

The present invention also provides, in one aspect, an arrangement which makes it possible to operate the emergency steering system pump even though the engine of the vehicle is not running, so that the vehicle can be steered to allow it to be pushed or otherwise moved utilizing an external source of power. U.S. Pat. No. 3,940,931 Renfro et al illustrates a different emergency steering system which provides for the steering of a vehicle even though the engine is not running. In another aspect the present invention provides for testing the emergency hydraulic system while the engine is running.

SUMMARY OF THE INVENTION

This invention provides an automatic emergency hydraulic system for a vehicle having a hydraulic steering mechanism and including an engine driven pump for supplying the steering mechanism for normal steering, and an electric motor driven pump for supplying hydraulic pressure for emergency steering. The system includes a solenoid operated switch for energizing the motor from the electrical source under predetermined conditions. A normally closed hydraulic condition switch is connected in circuit with the solenoid, the hydraulic condition switch being arranged to open upon the occurrence of a predetermined pressure or other condition in the hydraulic steering mechanism. The system includes a relay having a coil and two normally open switches, one of the switches being connected in circuit with the solenoid and the hydraulic condition switch. A normally open engine condition switch is arranged to close in response to a predetermined condition of the engine, the engine condition switch and the relay coil being connected in circuit, and the second switch of the relay being connected to maintain the relay coil energized while the engine condition switch remains closed.

BRIEF DESCRIPTION OF THE DRAWING

The single FIGURE of the drawing includes a diagrammatic illustration of a hydraulic steering mechanism for a vehicle and an emergency hydraulic system for the operation of the hydraulic steering mechanism.

DESCRIPTION OF THE PREFERRED EMBODIMENT

Figure 1:
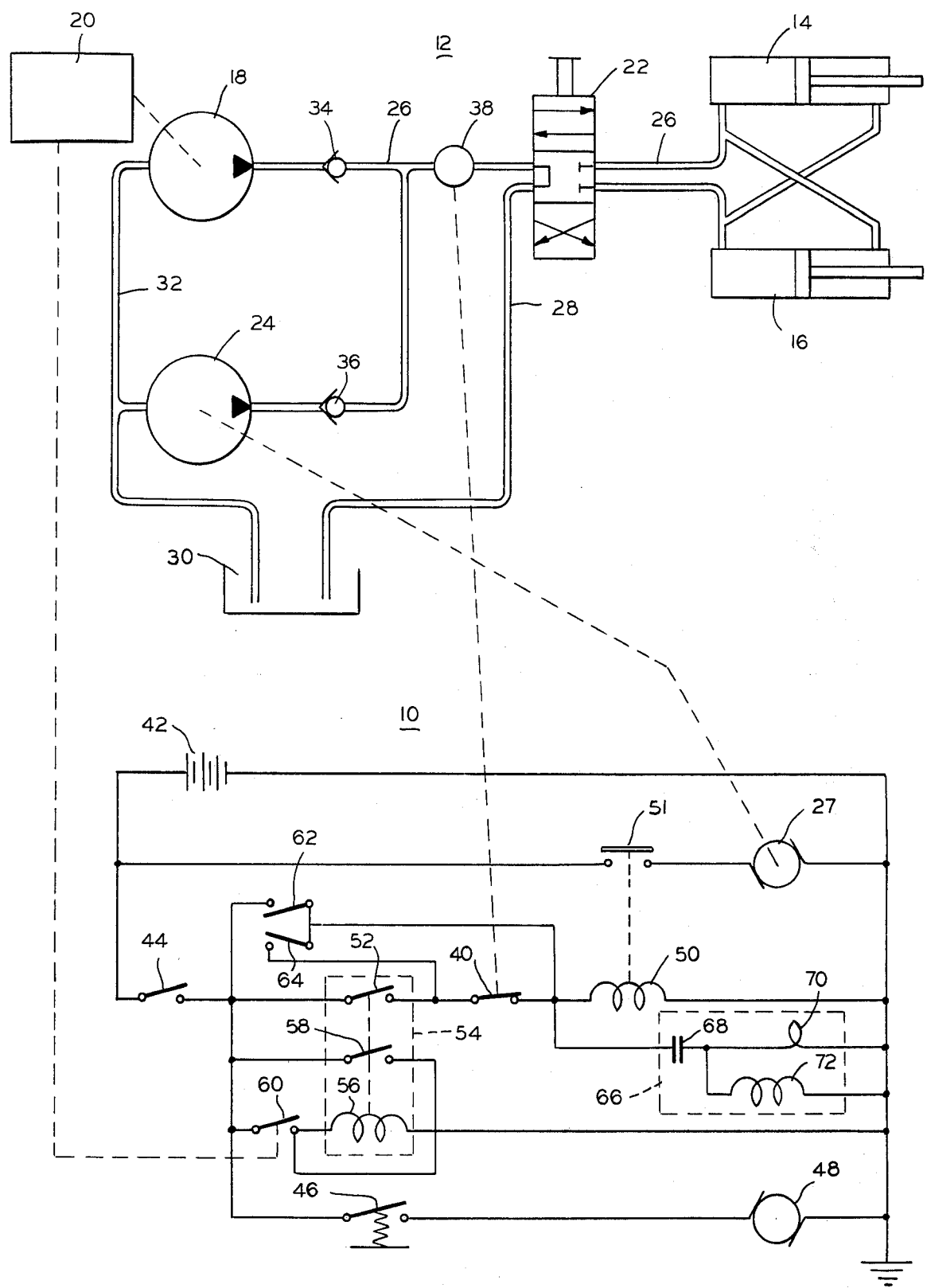

In the single FIGURE of the drawing, the numeral 10 indicates generally an emergency hydraulic system in accordance with the present invention. The emergency hydraulic system is interconnected with a hydraulic steering mechanism indicated generally by the numeral 12. The hydraulic steering mechanism includes in the preferred mode a pair of hydraulic actuators 14 and 16 of the piston and cylinder type which may provide the steering for an articulated wheel loader. The actuators 14 and 16 are normally supplied with pressurized hydraulic fluid from a pump 18 which is operated by the engine 20 which also propels the loader. A four-position three-way valve 22 under the control of the loader operator provides for steering the loader by push-pull operation of the actuators 14 and 16 to steer the loader in either direction or to hold the steering mechanism locked which is accomplished by the neutral position illustrated for valve 22.

An emergency steering pump 24 is provided for supplying the hydraulic steering mechanism in the event there is a failure of the supply of pressurized hydraulic fluid from pump 18 either because engine 20 ceases to operate or because of a failure in the hydraulic circuit. Pump 24 is driven by an electric motor 27 and is connected in parallel with pump 18 to the hydraulic conduit 26 supplying actuators 14 and 16. The two pumps utilize a common return line 28 to the reservoir 30 and a common suction line 32 to supply the pumps from reservoir 30. Check valves 34 and 36 are provided in the outlets of the pumps 18 and 24 respectively to prevent either pump from attempting to drive the other as a motor. A condition sensor 38 is present in hydraulic conduit 26, and in the preferred mode illustrated is pressure sensitive and arranged to open a switch 40 upon the occurrence of a predetermined pressure in conduit 26 and to close switch 40 again when the pressure in conduit 26 drops below a predetermined value.

The emergency hydraulic system 10 is supplied from a suitable electrical source such as a battery 42. The emergency hydraulic system is prepared for operation by the closing of a main switch 44. In addition to the emergency steering system the closing of the main switch 44 also makes possible the operation of a momentary contact starting switch 46 which energizes a starting motor 48 to initiate operation of the engine 20. It will be understood that main switch 44 and momentary contact switch 46 normally are embodied in a single key switch mechanism.

When the engine 20 starts it operates pump 18 and, barring a failure in the hydraulic circuit, pump 18 supplies the steering actuators 14 and 16 and the steering mechanism can be operated normally. If the engine stops unexpectedly the emergency steering system of the present invention provides for the emergency pump 24 to begin operation and supply the hydraulic steering mechanism as soon as sensor 38 indicates a sufficient loss of pressure in the hydraulic steering mechanism or other condition indicating an emergency. Switch 40 operated by sensor 38 is normally closed but opens after the pressure rises in the hydraulic steering mechanism. Switch 40 is in circuit with solenoid 50 which, when it is energized, closes switch 51 and energizes motor 27 to operate the emergency steering pump 24.

It is preferable not to energize solenoid 50 during starting of the engine, and since switch 40 is closed during such starting a switch 52 is connected in circuit with switch 40 and solenoid 50 to open the circuit to the solenoid. Switch 52 is one of two normally open switches forming a part of a relay 54 which includes a coil 56 and another switch 58.

It is necessary to close switch 52 after the engine starts, to prepare the emergency steering system for operation, and this is accomplished by utilizing a switch 60 which is responsive to a selected condition of engine 20 such as the lubricant pressure. After the engine starts and the lubricant pressure builds up switch 60 closes which energizes coil 56 and closes switch 52. This occurs after the opening of switch 40 and thus the circuit of solenoid 50 is not energized but is prepared for emergency operation should switch 40 later close.

In order to prevent switch 52 from opening when the engine 20 stops and the lubricant pressure drops switch 58 is connected in parallel with switch 60 and thus keeps coil 56 energized and holds the relay in the operated condition until main switch 44 is opened. Thus if the emergency steering system is operating it will continue operating until the operator opens the switch 44. The switch 44 normally is opened by the operator when he removes the key and leaves the machine and thus the system automatically is prepared for another operating cycle when the operator inserts the key and prepares the machine to start the engine again. When the engine and vehicle are operating normally the opening of switch 44 typically stops the engine by causing an interruption in the fuel supply.

Normally open switch 62 is provided in parallel with switches 52 and 40. If, after closing main switch 44, the switch 62 is closed to by-pass switches 52 and 40, the hydraulic steering mechanism can be operated even though the engine of the machine is not running inasmuch as solenoid 50 will be energized to close switch 51 and cause motor 27 to operate pump 24; this may be necessary under some emergency conditions to enable the machine to be steered while it is being moved by some outside instrumentality. Another normally open switch 64 bypasses switch 40 only. This switch is utilized to test the emergency steering system while the engine is running. Alarm 66 which may comprise a flasher 68, a light 70 and a buzzer 72, connected in parallel with solenoid 50, may be provided to indicate to the operator that solenoid 50 has been energized and that the emergency steering system thus is in operation whether such operation occurs as a result of a test or an actual emergency.

Although switches 62 and 64 have been shown as separate normally open single throw switches it will be understood that it is possible to substitute for these two switches a single normally open double throw switch.

While the invention has been disclosed in association with the hydraulic steering mechanism of a vehicle it is not limited to such use. It can be used for the emergency supply of pressurized hydraulic fluid to hydraulic brakes or other hydraulically operated devices on a vehicle in addition to or instead of the hydraulic steering mechanism.

While I have illustrated and described the best mode contemplated for carrying out my invention it will be appreciated that modifications may be made. Accordingly, it should be understood that I intend to cover by the following claims all such modifications which fall within the true spirit and scope of my invention. It should be understood also that where specific terms such as solenoid and coil have been employed in the claims they are intended to cover other equivalent means in the claimed system.

I claim:

1. An emergency hydraulic system for a vehicle having a hydraulic steering mechanism and including an engine driven pump for supplying the steering mechanism for normal steering, an electric motor driven pump for supplying the steering mechanism for emergency steering, and an electrical source for operating the motor of the motor driven pump, the system comprising a solenoid operated switch for energizing the motor from the electrical source upon the occurrence of a predetermined condition indicating subnormal operation of said hydraulic steering mechanism, the solenoid of said solenoid operated switch connected to be energized from the electrical source, a normally closed hydraulic condition switch connected in circuit with said solenoid, said hydraulic condition switch arranged to open upon the occurrence of a predetermined condition of the hydraulic steering mechanism indicating normal operation of said hydraulic steering mechanism, a relay having a coil and two normally open switches, one of said relay switches connected in circuit with said solenoid and said hydraulic condition switch, a normally open engine condition switch arranged to close in response to a predetermined condition of the engine indicating normal operation of the engine, said engine condition switch and said relay coil connected in circuit to the electrical source, and said second switch of the relay connected to maintain said relay coil energized while said engine condition switch remains closed.

2. An emergency hydraulic system as in claim 1 wherein a normally open single throw switch is provided to by-pass both said normally closed hydraulic condition switch and said one relay switch to provide emergency operation even though the vehicle engine is not running.

3. An emergency hydraulic system as in claim 1 in which a second normally open single throw switch is provided to by-pass said manually closed hydraulic condition switch in order to test the emergency hydraulic system when the vehicle engine is running.

4. An emergency hydraulic system as in claim 1 in which a normally open double throw switch is provided selectively to by-pass simultaneously both said normally closed hydraulic condition switch and said one relay switch to provide emergency operation when the vehicle engine is not running, or to by-pass only said normally closed hydraulic condition switch to test the emergency hydraulic system when the vehicle engine is running.

5. An emergency hydraulic system as in claim 1 wherein said hydraulic condition switch which opens upon the occurrence of said second predetermined condition in the hydraulic steering mechanism recloses upon the occurrence of said first predetermined condition in the hydraulic steering mechanism.

6. An emergency hydraulic system as in claim 5 wherein said hydraulic condition switch is pressure sensitive and operates responsively to the hydraulic pressure in said hydraulic steering mechanism.

* * * * *